Nov. 17, 1970 T. O. PAINE, DEPUTY ADMINISTRATOR OF THE NATIONAL AERONAUTICS AND SPACE ADMINISTRATION 3,541,346

MAGNETIC POWER SWITCH

Filed July 31, 1968

EDWIN K. VAN DE RIET
*INVENTOR.*

BY [signature]

ATTORNEYS

United States Patent Office
3,541,346
Patented Nov. 17, 1970

3,541,346
MAGNETIC POWER SWITCH

T. O. Paine, Deputy Administrator of the National Aeronautics and Space Administration, with respect to an invention of Edwin K. van De Riet, Mountain View, Calif.

Filed July 31, 1968, Ser. No. 749,181
Int. Cl. G11c *11/08*
U.S. Cl. 307—88 5 Claims

ABSTRACT OF THE DISCLOSURE

A magnetic power switch is disclosed which comprises a transfluxor-type magnetic core, with a major and a minor aperture. The state of the switch is controlled by controlling the direction of flux about the major aperture. Separate decoupled power sources and power loads are coupled to two core legs, one of which is between the major and minor aperture and the other between the minor aperture and the core periphery. The switch is turned ON by setting the flux in one of these legs. The leg is cleared when power is transferred from the source to the load coupled thereto, at the same time setting the flux in the other leg, which is cleared when power is transferred from the source, to the load coupled thereto.

ORIGIN OF INVENTION

The invention described herein was made in the performance of work under NASA contract and is subject to the provisions of Section 305 of the National Aeronautics and Space Act of 1958, Public Law 85–568 (72 Stat. 435; 42 USC 2457).

BACKGROUND OF THE INVENTION

Field of the invention

This invention generally relates to a magnetic switching arrangement and, more particularly, to a power switch which uses a transfluxor-type magnetic core.

Description of the prior art

The prior art is replete with systems and devices which employ magnetic cores for data storage, logic performance and signal switching. Typically, the cores, which are employed, have magnetic properties which are characterized by a substantially rectangular hysteresis loop so that the core may be switched between two stable states of magnetic remanence. When magnetic cores are employed to function as a switching arrangement, means are provided to switch the arrangement between ON and OFF states. Additional means are provided so that only in the ON state may signals be switched between one or more signal sources to one or more loads.

The desired properties of such a switching arrangement are high power handling capability, fail-safe operation, simplicity and reliability in switching from the ON to the OFF state and minimization of the likelihood of a change of state, especially from OFF to ON, due to the supply of excessive power from any of the sources to a load.

OBJECTS AND SUMMARY OF THE INVENTION

It is a primary object of the present invention to provide an improved magnetic core-utilizing switching arrangement.

Another object of the present invention is the provision of a magnetic core-utilizing switching arrangement which is characterized by substantially all the aforementioned desirable properties.

A further object of the invention is to provide a relatively simple switching arrangement which employs a magnetic core operable so that the switching of the arrangement from OFF to ON does not result in erroneous power transfer to a load.

Still a further object of the invention is the provision of magnetic core-utilizing switching arrangement in which excessive core drive, produced during power transfer between a source and a load, does not change the state of the switching arrangement.

These and other objects of the invention are achieved by providing a switching arrangement or simply a switch in which a transfluxor-type magnetic core, with a minor and a major aperture, is employed. The flux path about the minor aperture may be thought of as being of a unit cross-sectional area. It defines a first leg, hereafter referred to as leg A, between the major and minor apertures' periphery, and a second, leg B, between the minor aperture and core periphery. The flux path about the major aperture defines a control leg of two units of cross-sectional area.

The state of the switch is controlled by controlling the direction of flux about the major aperture represented by the control leg. In the OFF state, the two units of flux in the control leg are in the same direction, such as clockwise, with one unit forming an outer loop about both apertures and an inner loop about the major aperture only. These directions of flux in legs A and B may be thought of as the clear flux direction. The switch is switched ON by reversing the direction of flux of the inner loop so that the flux in leg A is set.

Separate decoupled sources and decoupled loads are inductively coupled to legs A and B so that after the switch is turned ON, power may be supplied from the source to the load, coupled to leg A, by driving the flux therein to the clear direction. With the loads and sources decoupled, flux switching occurs in the shortest path which is around the minor rather than the major aperture. Consequently, when leg A is driven to the clear direction, leg B is set. A subsequently supplied signal from a source, associated with leg B, causes the flux therein to be driven to the clear direction and thereby induce a signal which is supplied to the load which is associated with leg B.

Since in operation legs A and B are driven only in the clear direction by their respective sources, any setting of flux around the major aperture due to drives on the minor aperture, is avoided. Thus, the maximum allowable drive on the minor aperture by either of the sources is not critical. Furthermore, the operation of the switch of the present invention is such that any oversetting of the major aperture is automatically cleared out by the subsequent drive on the minor aperture. Consequently, the maximum drive necessary to turn the switch ON is not critical.

When the switch is in the OFF state, it presents a very low impedance to the power source; large currents must be prevented from flowing by one of the following means: (1) Using a current source for the power source, (2) connecting the power source to a group of these switches connected in series and insuring that any one but only one switch in the group will be on at all times, and (3) providing another minor aperture on the core which is connected in series with the given minor aperture to switch, when necessary, to provide an impedance for the power source.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
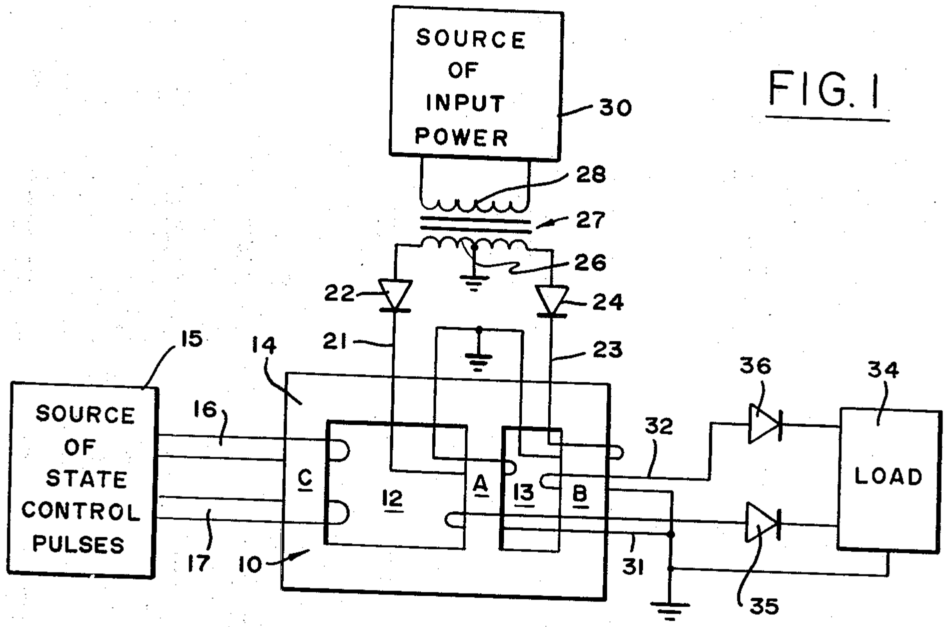
FIG. 1 is a combination schematic and block diagram of the present invention.
Figure 2A:
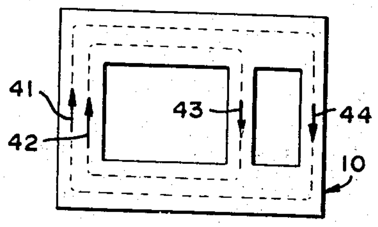
FIGS. 2(*a*) through 2(*d*) are schematic diagrams of the magnetic core illustrating various flux states thereof which are useful in explaining the novel features of the invention.
Figure 2B:
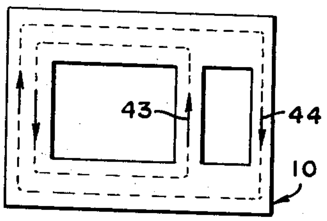
Figure 2C:
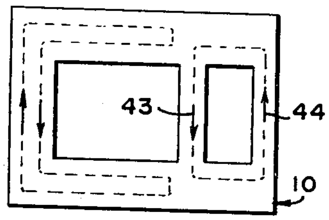
Figure 2D:
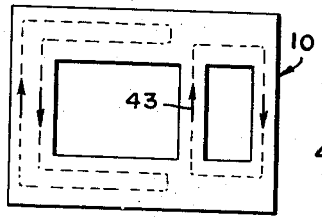

Reference is now made to FIG. 1 wherein numeral 10 designates a transfluxor-type magnetic core with a major aperture 12 and a minor aperture 13. The core is constructed to define a control leg 14, hereafter referred to as leg C, between the major aperture and the core periphery. The core portion between apertures 12 and 13 defines a leg A and the portion between aperture 13 and the core periphery defines a leg B. The cross-sectional area of each of legs A and B may be thought of as representing one (1) unit, while the cross-sectional area of leg C is of two units.

Control leg C is shown inductively coupled to a source of state control pulses 15 by windings 16 and 17. To simplify FIG. 1, all windings are shown as single turn. An input winding 21 connected between a reference potential, such as ground and the emitter of a diode 22 is wound about leg A, while a similar input winding 23 connected between ground and the emitter of a diode 24 is wound about leg B. The collectors of diodes 22 and 24 are connected to opposite ends of a secondary winding 26 of a power transformer 27, whose primary winding 28 is connected to a source of input power 30.

Legs A and B are further wound by respective output windings 31 and 32, each having one end connected to a load 34 through respective diodes 35 and 36. The other end of each of the two-latter-mentioned windings is grounded. It should be pointed out that in FIG. 1 windings 16 and 17 are wound about leg C in opposite senses, and that similarly windings 21 and 23 about legs A and B are of opposite senses. Contrary thereto, windings 31 and 32 are wound in the same sense.

Briefly, the magnetic switch of the present invention is operable to be in either an OFF, sometimes also referred to as the clear state, or an ON or set state. The state is controlled by controlling the direction of magnetic flux about the major aperture 12. Power is transferable to load 34 from source 30 only when the switch is in the ON state or simply ON. When the switch or core 10 is ON, the direction of flux in leg A is opposite the OFF or clear flux direction therein. Current in winding 21, reverses the flux direction in leg A to its clear state. The flux reversal induces a voltage in winding 31 which is supplied to load 34. Also, the flux reversal in leg A in essence reverses the flux direction in leg B. Thus, when voltage is applied by source 30 the current, induced in winding 23, returns the direction of flux in leg B to its clear state, inducing a voltage in output winding 32 which is in turn supplied to load 34.

The impedances of the load 34 and source 30 are decoupled from the flux switching in leg B when leg A is driven, by diodes 36 and 24, respectively, while diodes 35 and 22 isolate the source and load from leg A when leg B is driven. Consequently, flux switching occurs in the shortest path, which is around the minor aperture 13, rather than around the major aperture 12. It should also be pointed out that the power transfer is achieved by alternately driving legs A and B to their clear or OFF state. Such a driving arrangement together with the load and source decoupling greatly enhance the operation of the switch of the present invention since they prevent the switch from being switched to its OFF state due to excessive drive currents.

Attention is now directed to FIGS. 2(*a*) through 2(*d*) which are schematic diagrams of the magnetic core 10, shown in FIG. 1, illustrating different flux states thereof. Arrows 41 and 42 represent flux directions about the major aperture 12 and, particularly in control leg C, while arrows 43 and 44 represent flux directions in legs A and B, respectively. FIGS. 2(*a*) and 2(*b*) illustrate the flux states when the switch is in the OFF and ON states, respectively. FIG. 2(*c*) illustrates the flux conditions in the core after leg A is driven to its clear state, and the flux conditions after leg B is driven to clear are illustrated in FIG. 2(*d*).

As seen from FIG. 2(*a*), when the core is in the OFF state, the two units of flux about the major aperture are in the same direction. One flux unit, represented by arrow 41, forms a clockwise directed flux loop with the flux in leg B about both apertures, while the other flux unit, represented by arrow 42, also forms a clockwise directed flux loop with the flux in leg A about major aperture 12. For explanatory purposes the flux in both legs A and B may be thought of as pointing down when the switch is in the OFF state.

The switch is turned ON by a pulse on one of the control windings, such as winding 16 (FIG. 1), which in essence reverses the direction of flux about aperture 12. This is illustrated in FIG. 2(*b*) by the counterclockwise flux loop about the aperture 12. Thus, in the ON state the two units of flux in leg C are in opposite directions. Also, when the switch is first turned ON, the direction of flux in leg A (arrow 43) is up.

Voltage from source 30 induces current in winding 21 driving leg A to its clear state, as shown in FIG 2(*c*) by arrow 43 pointing down. Due to the decoupled load and source impedances, flux switching occurs around the minor aperture 13. Consequently, the flux in leg B (arrow 44) points up. The flux in leg C, however, does not change, remaining in opposite directions. A subsequent voltage from source 30 induces a current in winding 23 which reverses the flux in leg B, driving it to its clear state. Due to the reversal of flux about aperture 13, the flux in leg A is driven to its set state. This is again represented by arrow 43 pointing up in FIG. 2(*d*).

From the figures it should be appreciated that once the switch is turned ON, successive voltages are applied to the load 34 by alternately driving legs A and B to their clear states. When leg A is driven to such a state, the flux around the minor aperture is in one direction, such as counterclockwise, in which case the flux in leg B is set. Then, when leg B is cleared, the flux around the minor aperture is in a clockwise direction and leg A is set. The switch may be turned OFF by applying a control pulse to clear winding 17 which switches the direction of flux represented by arrow 42 so that the two units of flux arrows 41 and 42 in leg C are in the same direction.

The novel switch has an additional important advantage which consists of automatic clearing of excess flux, which may be set therein, when the switch is turned ON. This advantage may best be explained together with FIGS. 3(*a*), 3(*b*) and 3(*c*), which are schematic diagrams of the core 10 illustrating flux states.

Figure 3A:
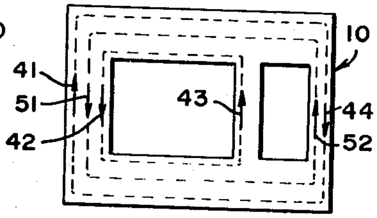
FIGS. 3(*a*) through 3(*c*) are additional schematic diagrams of the magnetic core illustrating various flux states thereof.
Figure 3B:
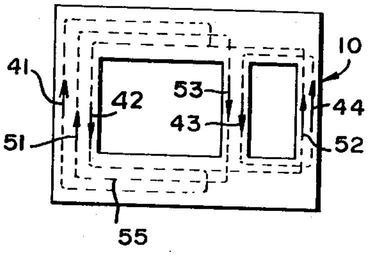
Figure 3C:
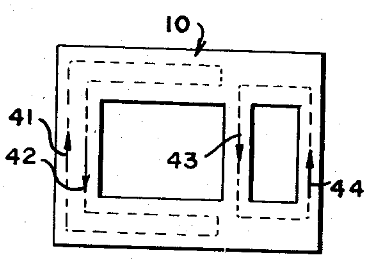

Basically, FIG. 3(*a*) illustrates the case in which more than one unit of flux is switched in the counterclockwise direction in leg C when the switch is first turned ON. The proper flux switching is represented by downward arrow 42, as is the case in FIG. 2(*b*), while the excess switched flux is represented by short arrow 51. This excess flux forms a closed flux loop around both apertures so that part of the flux in leg B is in the set state, as represented by upward arrow 52. Consequently, the amount of set flux in leg A is less than the amount of flux in the clear state in leg B.

When leg A is driven to the clear state, it has more flux to switch to the clear state, i.e., down, then leg B has to switch up, since some of the flux in leg B is already up (arrow 52). Consequently, the flux in leg B is switched completely up (set state) before the leg A flux is switched completely to its clear state. The flux in leg A, which switches to its clear state after the leg B flux is completely set, switches back around the major aperture 12, reversing the direction of the excess flux about the major aperture.

In FIG. 3(*b*), the flux in leg A which is used to reverse the excess flux (arrow 51) is represented by arrow 53, which together with arrow 51 form a closed flux loop 55 about aperture 12. The various flux lines in FIG. 3(*b*) may be uncrossed and the arrows combined to define the flux paths as shown in FIG. 3(*c*). As is appreciated, FIG. 3(*c*) is identical with FIG. 2(*c*), both illustrating the flux states in core 10 after leg A is driven to its clear state.

From FIGS. 3(*a*), 3(*b*) and 3(*c*), it should thus be appreciated that in the switch of the present invention, any excess flux switching which occurs when the switch is driven to its ON state, does not affect the performance of the switch, nor does it produce an erroneous output pulse. Rather, such excess switched flux is cleared when the first output pulse is induced which occurs when leg A is driven to its clear state.

It should be pointed out that the switch of the present invention tends to turn itself OFF in the event of a short circuit failure in any of the windings. For example, in the case of a load caused by a short, the required decoupling which is provided by the four diodes is no longer present. Consequently, when normal drive voltages are applied, resulting in induced driven currents, the flux direction does not change around the minor aperture as shown in FIGS. 2(*b*) and 2(*c*), but rather is cleared around the major aperture so that the switch is turned OFF.

Although particular embodiments of the invention have been described and illustrated herein, it is recognized that modifications and variations may readily occur to those skilled in the art and, consequently, it is intended that the claims be interpreted to cover such modifications and equivalents.

What is claimed is:

1. A magnetic circuit for controlling the transfer of power between a source and a load, said circuit comprising:

a magnetic core defining a major aperture and an adjacent minor aperture, said core being of a material having two states of magnetic remanence and switchable therebetween, said core defining a control leg between said major aperture and the core periphery, a first leg between the major and minor aperture and a second leg between said minor aperture and the core periphery;

control means inductively coupled to said control leg for switching said core between ON and OFF states by controlling the flux direction in said control leg;

first and second pairs of windings inductively coupled to said first and second core legs respectively;

a source of power and a power load;

first coupling means connecting said source to a first winding of said first pair and a first winding of a said second pair; and second coupling means connecting said load to a second winding of said first pair and to a second winding of said second pair, whereby when said core is in said ON state the flux is switchable about said minor aperture inducing power in either the second winding of said first pair or the second winding of said second pair, said first coupling means including a pair of decoupling diodes for controlling the supply of a first polarity signal from said source to the first winding of said first pair and the supply of a second polarity signal to the first winding of said second pair, and said second coupling means including a separate decoupling diode in series with each of said second windings, to control the supply of signals to said load as a function of the changes in the flux directions in said first and second legs.

2. The magnetic circuit as recited in claim 1 wherein the diodes in said second coupling means are connected with polarities so that a voltage is induced in the second winding of said first pair when the flux in said first leg is switched to its OFF state direction and a voltage is induced in the second winding of said second pair when the flux in said second leg is switched to its OFF state direction.

3. The magnetic circuit as recited in claim 2 wherein the cross-sectional area of said control leg defines two units of flux and the cross-sectional area of each of said first and second legs defines one unit of flux, the two units of flux in said control leg in the OFF state being in the same direction and in opposite directions in the ON state, the flux in said first and second legs being in the same direction and in said OFF state and in opposite directions in said ON state.

4. A magnetic switch comprising:

a transfluxor-type magnetic core of material having two states of magnetic remanence and switchable therebetween, said core defining a major aperture and a minor aperture, the core portion between the major aperture and the core periphery defining a control leg of two flux units of cross-sectional area, the core portions between the two apertures and the minor aperture and the core periphery defining first and second legs each of one unit of cross-sectional area;

state control means inductively coupled to said control leg for controlling the direction of the two units of flux therethrough to be either in the same direction representing an OFF state or in opposite direction representing ON state in which one unit of flux in the control leg and in said first leg form a closed flux loop about the major aperture with the flux in the first leg being in a set direction opposite its clear direction when said core is in the OFF state;

a source of power and a load to which the power is to be supplied; and coupling means connecting said source and said load to said first and second legs, whereby voltage of a first polarity from said source reverses the direction of flux in said first leg from its set to its clear state to induce a potential supplied to said load, said flux reversal in said first leg resulting in a flux reversal in said second leg from its clear to its set state, wherein, said coupling means include decoupling means for decoupling said load from said first and second legs, so that when said switch is in its ON state, flux reversal occurs only about the minor aperture and a potential is supplied to said load from the leg which is driven to its clear state.

5. The magnetic switch as recited in claim 4 wherein said coupling means include decoupling diodes which decouple said source from said load so that a voltage of a first polarity from said source drives said first leg to its clear state, reversing the direction of flux in said second leg to its set state and a voltage of a second polarity from said source reverses the flux direction in said second leg from said set to its clear state.

References Cited

Publication I—IBM Technical Disclosure Bulletin, vol. 8, No. 10, March 1966, p. 1413.

JAMES W. MOFFITT, Primary Examiner

U.S. Cl. X.R.

340—174